US008822959B1

(12) United States Patent
DeRose et al.

(10) Patent No.: US 8,822,959 B1
(45) Date of Patent: Sep. 2, 2014

(54) METHOD AND APPARATUS FOR OPTICAL PHASE ERROR CORRECTION

(71) Applicant: Sandia Corporation, Albuquerque, NM (US)

(72) Inventors: Christopher DeRose, Albuquerque, NM (US); Daniel A. Bender, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 14/012,061

(22) Filed: Aug. 28, 2013

(51) Int. Cl.
*G21K 5/10* (2006.01)
*G02F 1/01* (2006.01)
*G21K 5/04* (2006.01)

(52) U.S. Cl.
CPC ............... *G02F 1/0147* (2013.01); *G21K 5/04* (2013.01)
USPC ........................................................ 250/492.1

(58) Field of Classification Search
USPC ........................................................ 250/492.1
See application file for complete search history.

(56) References Cited

U.S. PATENT DOCUMENTS 8,184,992 B2 * 5/2012 Kikuchi ........................ 398/202

OTHER PUBLICATIONS

Derose et al., "Silicon Microring Modulator with Integrated Heater and Temperature Sensor for Thermal Control", Lasers and Electro-Optics (CLEO) and Quantum Electronics and Laser Science Conference (QELS), pp. 1-2 (May 2010).

Lentine et al., "Active wavelength control of silicon microphontonic resonant modulators", IEEE Optical Interconnects Conference, pp. 45-47 (2012).
Padmaraju et al., "Thermal stabilization of a microring modulator using feedback control", Optics vol. 20, Issue 27, pp. 27999-28008 (2012).
Shen Y. et al., "Perfect set-and-forget alignment of silicon photonic resonators and interferometers", Optical Fiber Communication Conference and Exposition and the National Fiber Optic Engineers Conference (OFC/NFOEC), pp. 1-3 (2011).
Teng, J et al., "Athermal Silicon-on-insulator ring resonators by overlaying a polymer cladding on arrowed waveguides", Optics Express, vol. 17, Issue 17, pp. 14627-14633 (2009).
Deutschmann, et al., "Direct Sub-um Lateral Patterning of SOI by Focused Laser Beam Induced Oxidation," Int. Journal of Microelectronic Engineering, 48, pp. 367-370 (1999).
Hennessy et al., "Tuning photonic nanocavities by atomic force microscope nano-oxidation," Applied Physics Letters, 89, 041118, pp. 1-3 (2006).
Huber et al., "Local laser induced rapid thermal oxidation of SOI substrates," Applied Surface Science, 168(1-4), pp. 204-207 (2000).

(Continued)

*Primary Examiner* — Kiet T Nguyen
(74) *Attorney, Agent, or Firm* — Martin I. Finston

(57) ABSTRACT

The phase value of a phase-sensitive optical device, which includes an optical transport region, is modified by laser processing. At least a portion of the optical transport region is exposed to a laser beam such that the phase value is changed from a first phase value to a second phase value, where the second phase value is different from the first phase value. The portion of the optical transport region that is exposed to the laser beam can be a surface of the optical transport region or a portion of the volume of the optical transport region. In an embodiment of the invention, the phase value of the optical device is corrected by laser processing. At least a portion of the optical transport region is exposed to a laser beam until the phase value of the optical device is within a specified tolerance of a target phase value.

20 Claims, 15 Drawing Sheets

(56) References Cited

OTHER PUBLICATIONS

Lee, H.S. et al., "Local tuning of photonic crystal nanocavity modes by laser-assisted oxidation," Applied Physics Letters, 95, 191109, pp. 1-3 (2009).

Micheli et al., "Photon-controlled oxidation of silicon," Applied Physics Letters, vol. 51, No. 15, pp. 1149-1151 (Oct. 12, 1987).

Takada, K., "Phase Error Measurement of an Arrayed-Waveguide Grating in the 1.3-um Wavelength Region by Optical Low Coherence Inteferometry," IEEE Photonics Technology Letters, vol. 14, No. 7, pp. 965-967 (Jul. 2002).

* cited by examiner

VIEW B

VIEW B

VIEW B

VIEW B

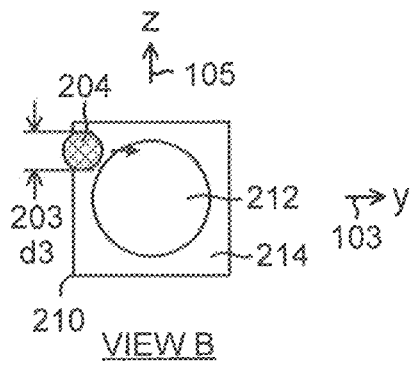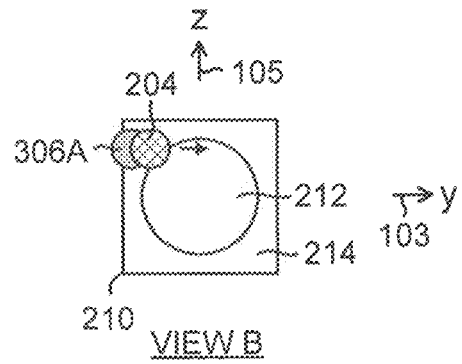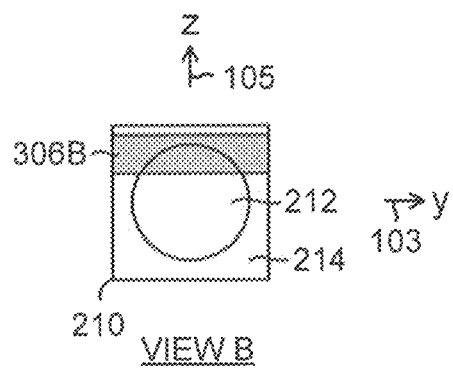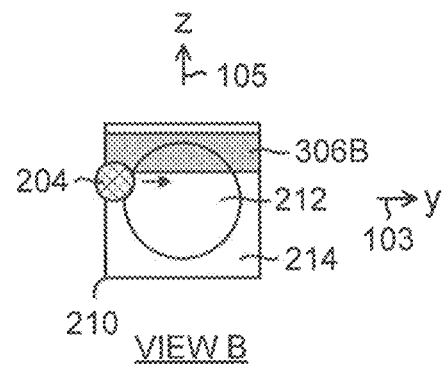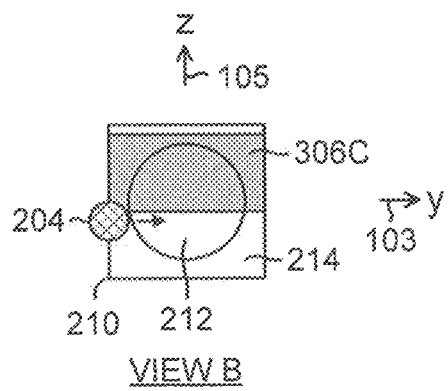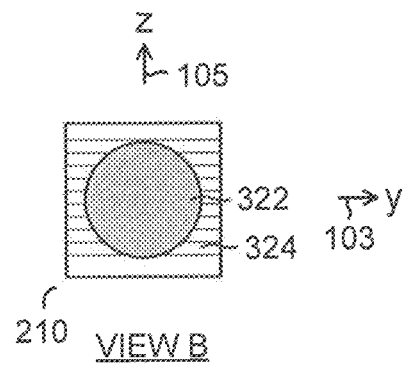

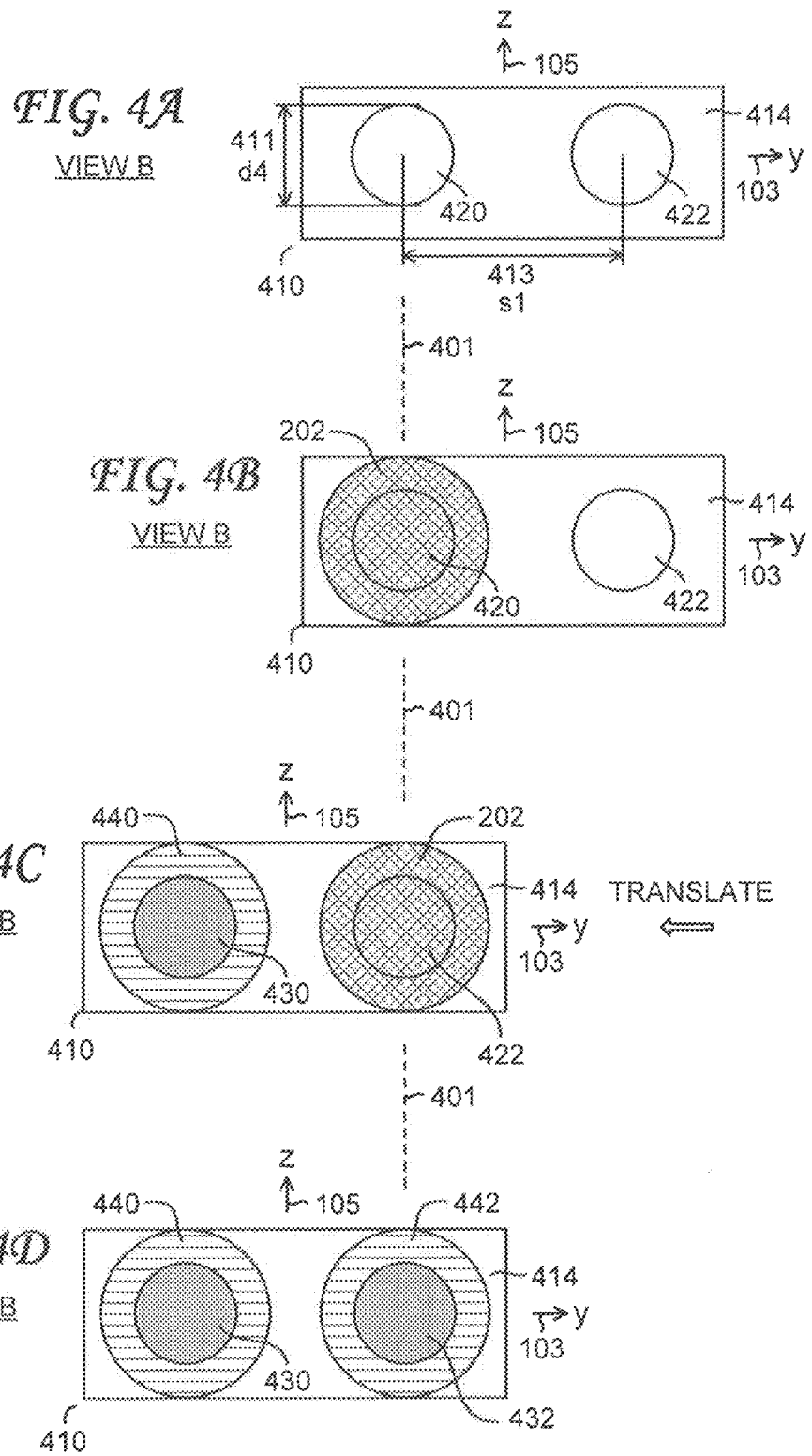

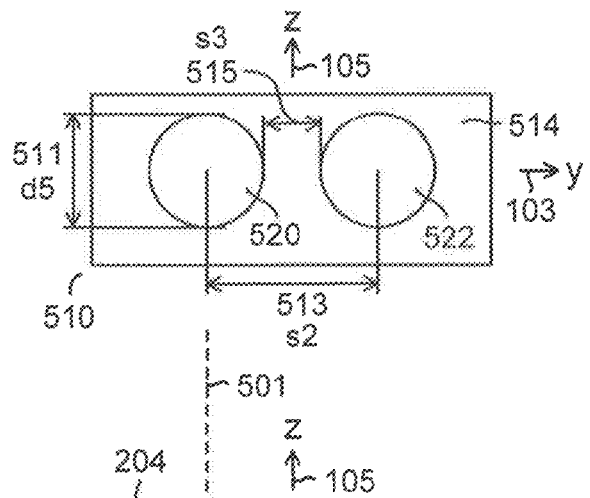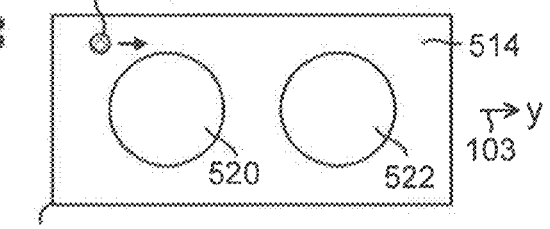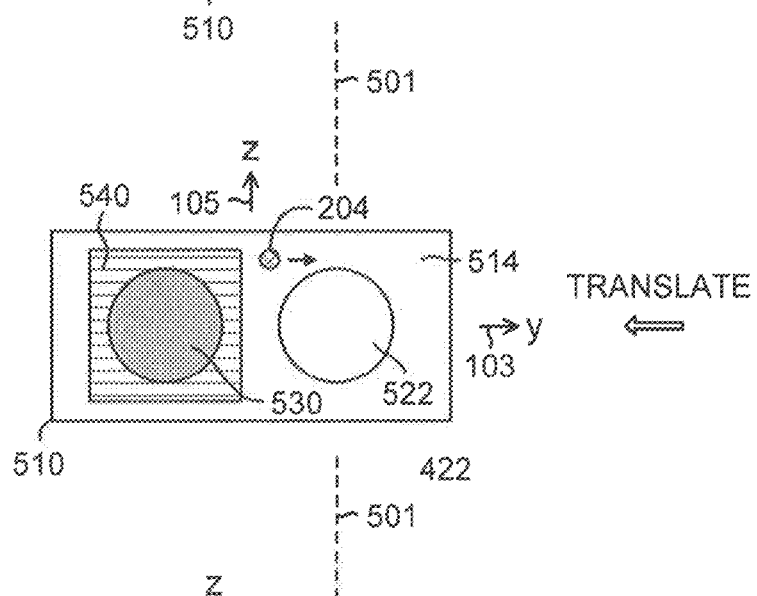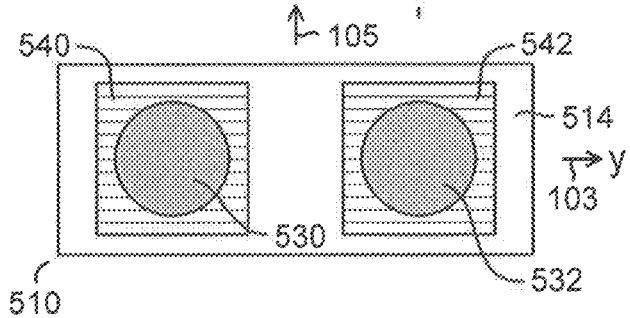

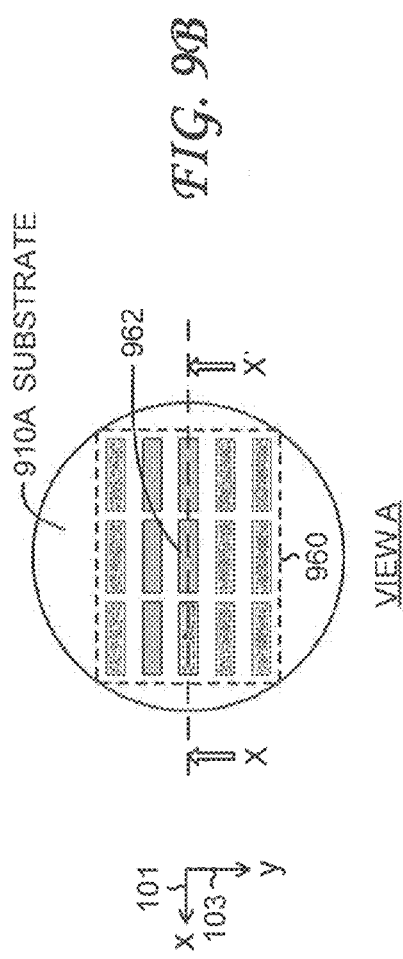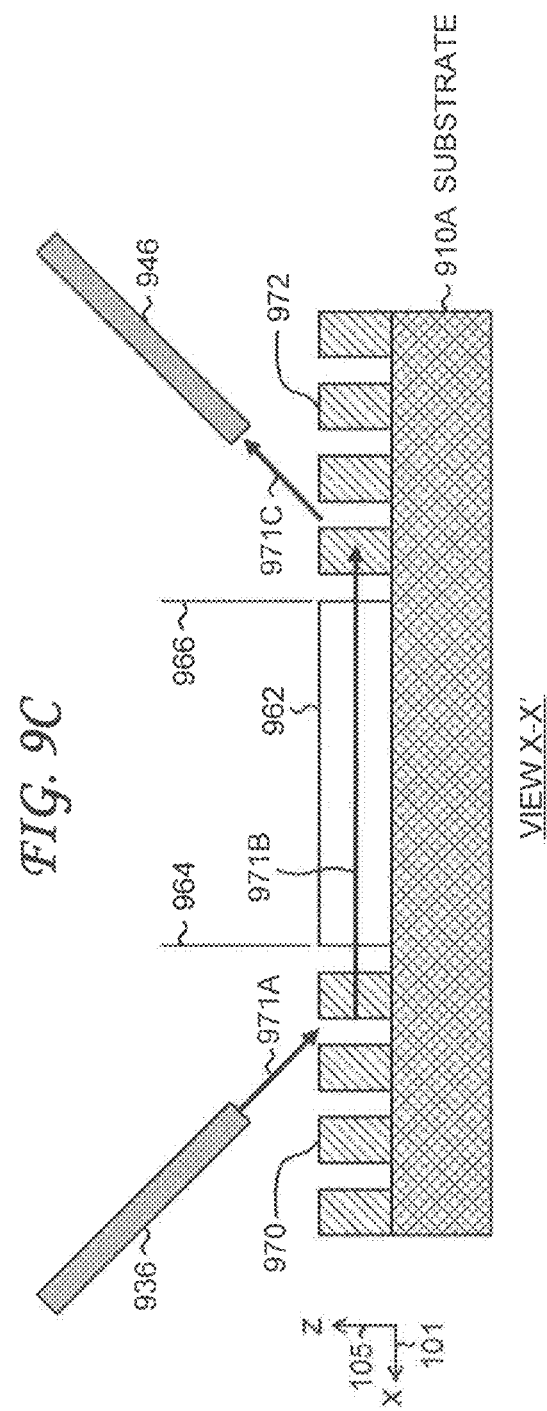

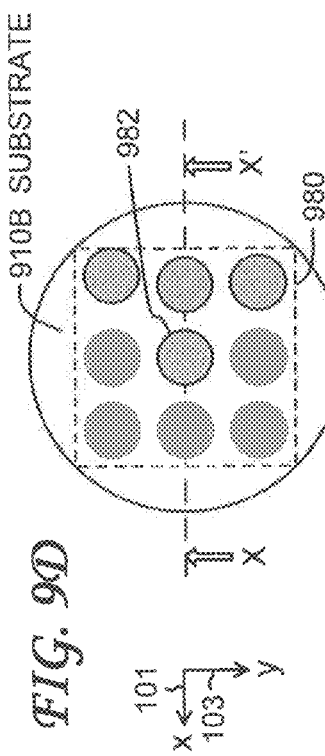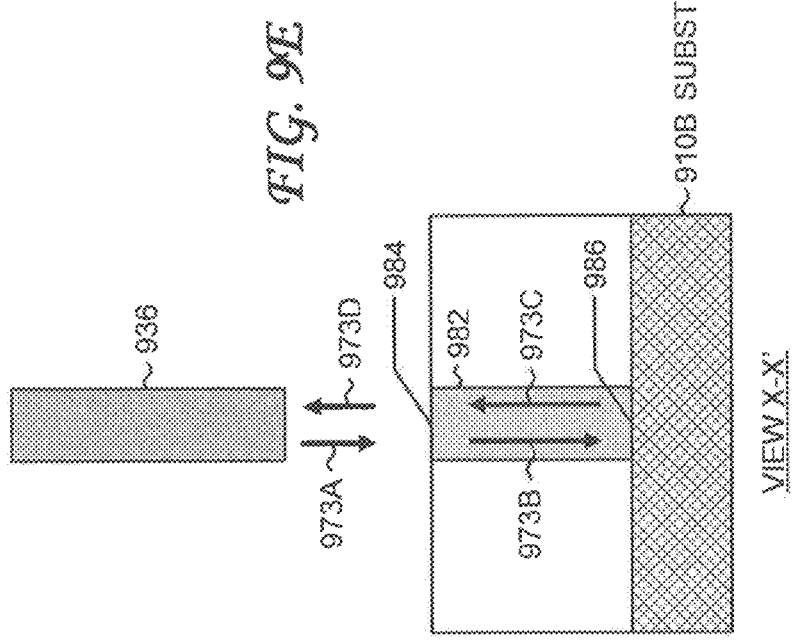

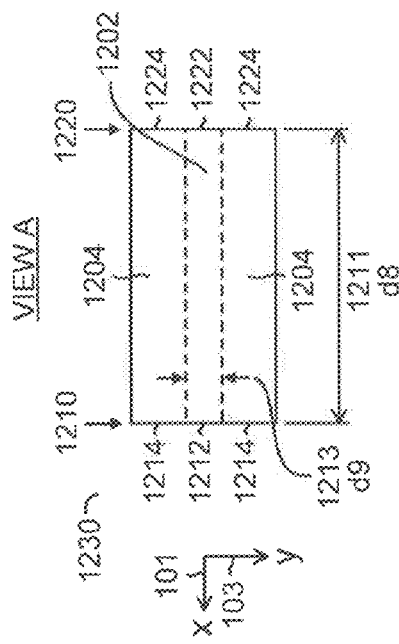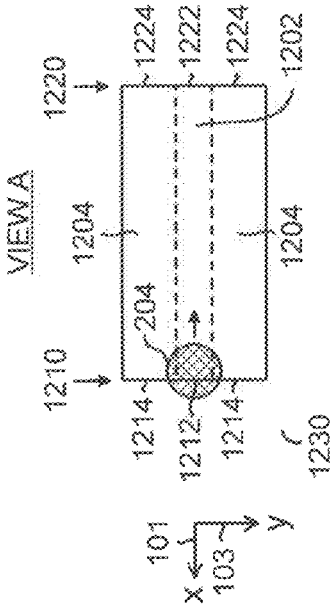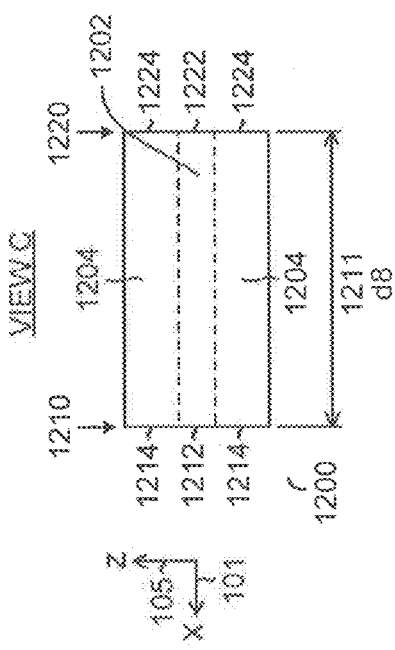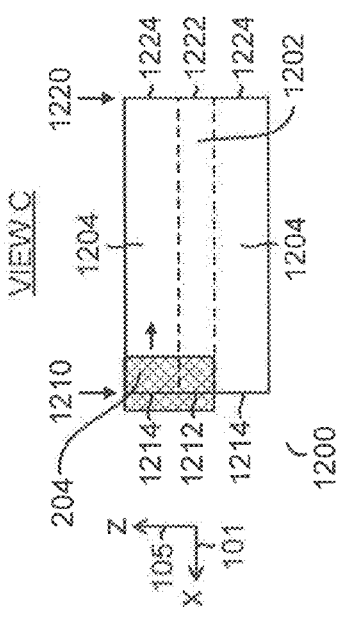

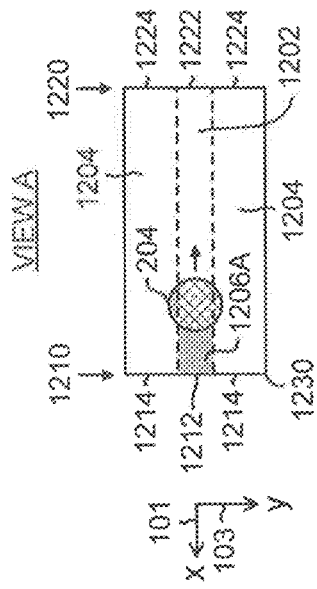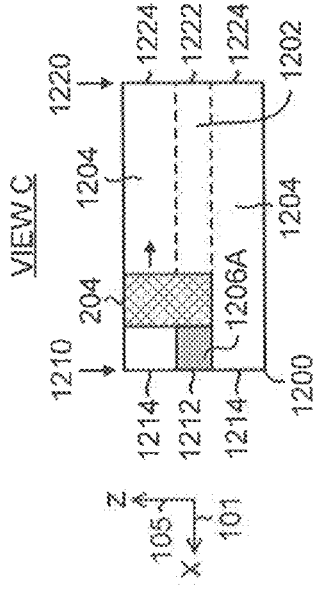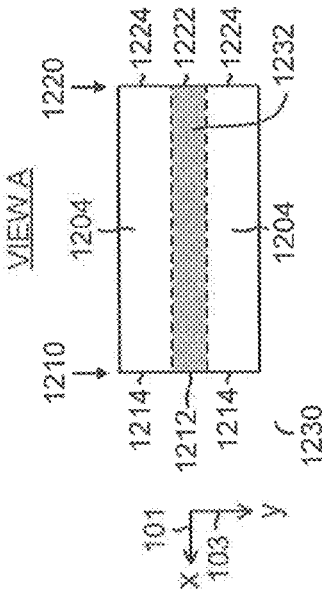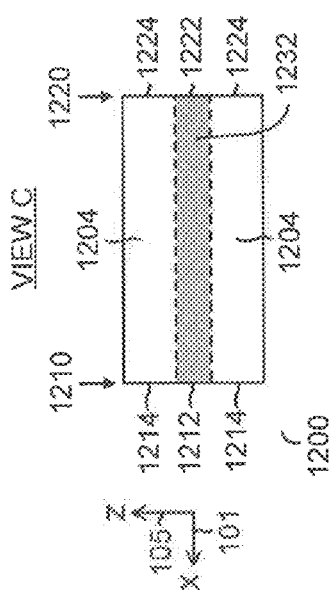

US 8,822,959 B1

METHOD AND APPARATUS FOR OPTICAL PHASE ERROR CORRECTION

STATEMENT OF GOVERNMENT INTEREST

This invention was developed under Contract DE-AC04-94AL85000 between Sandia Corporation and the U.S. Department of Energy. The U.S. Government has certain rights in this invention.

BACKGROUND OF THE INVENTION

The present invention relates generally to optical devices, and more particularly to phase error correction of optical devices.

The operation of certain optical devices, such as waveguides, is phase sensitive. Control of the phase during device fabrication is typically not sufficiently precise, and phase correction needs to be applied after device fabrication. There are various methods for inducing a temporary phase shift in an optical device using mechanisms which actively dissipate power; examples of these methods include thermo-optic induced phase shifts, electro-optic induced phase shifts, and plasma-dispersion induced phase shifts. What are needed are method and apparatus for permanently correcting the phase of a phase-sensitive optical device. Phase correction without active power dissipation is particularly advantageous.

BRIEF SUMMARY OF THE INVENTION

The phase value of a phase-sensitive optical device, which includes an optical transport region, is modified by laser processing. At least a portion of the optical transport region is exposed to a laser beam such that the phase value is changed from a first phase value to a second phase value, where the second phase value is different from the first phase value. The portion of the optical transport region that is exposed to the laser beam can be a surface of the optical transport region or a portion of the volume of the optical transport region. In an embodiment of the invention, the phase value of the optical device is corrected by laser processing. At least a portion of the optical transport region is exposed to a laser beam until the phase value of the optical device is within a specified tolerance of a target phase value.

These and other advantages of the invention will be apparent to those of ordinary skill in the art by reference to the following detailed description and the accompanying drawings.

BRIEF DESCRIPTION OF THE DRAWINGS

FIG. 3A-FIG. 3F show schematics for laser processing of an optical device by rastering a laser beam across an end face;

FIG. 4A-FIG. 4D show schematics for laser processing of multiple optical devices using full-field illumination of end faces;

FIG. 5A-FIG. 5D show schematics for laser processing of multiple optical devices by rastering a laser beam across end faces;

FIG. 9A-FIG. 9E show schematics of an apparatus for phase correction of optical devices;

FIG. 12A-FIG. 12H show schematics for laser processing of an optical device by rastering a laser beam across the optical transport region.

DETAILED DESCRIPTION

The operation of certain optical devices is phase sensitive. Some examples of phase-sensitive optical devices include the following:

- Optical-fiber based devices, such as Bragg gratings. These devices are fabricated from doped silica glasses.
- Microbead resonators. These devices are fabricated from silica on silicon and from silica fibers.
- Optical waveguide devices. These devices are fabricated from various materials, including silicon, germanium, compound semiconductors, and polymers.
- Electro-optic polymer devices. These devices are fabricated from guest-host polymer systems.
- Free carrier effect based modulators. These devices are fabricated from various semiconductor materials, including silicon, germanium, and compound semiconductors.
- Electro-optic devices. These devices are fabricated from non-centro-symmetric crystalline materials, such as lithium niobate.
- Semiconductor lasers. These devices are fabricated from compound semiconductors.

Figure 1A:
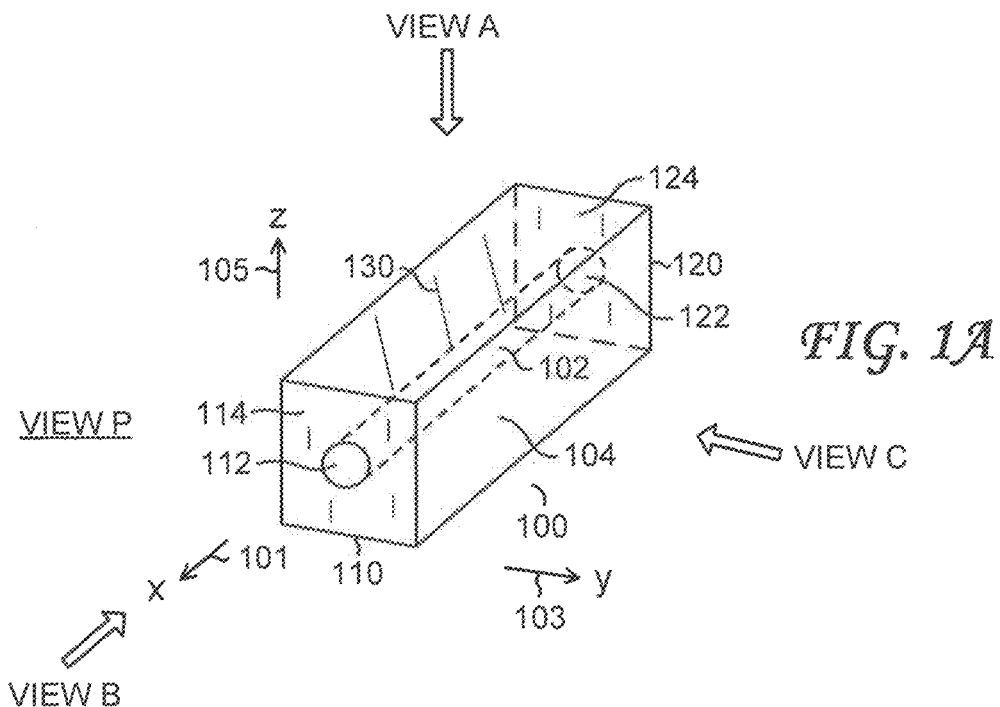
FIG. 1A-FIG. 1C show schematics of an optical device.
Figure 1B:
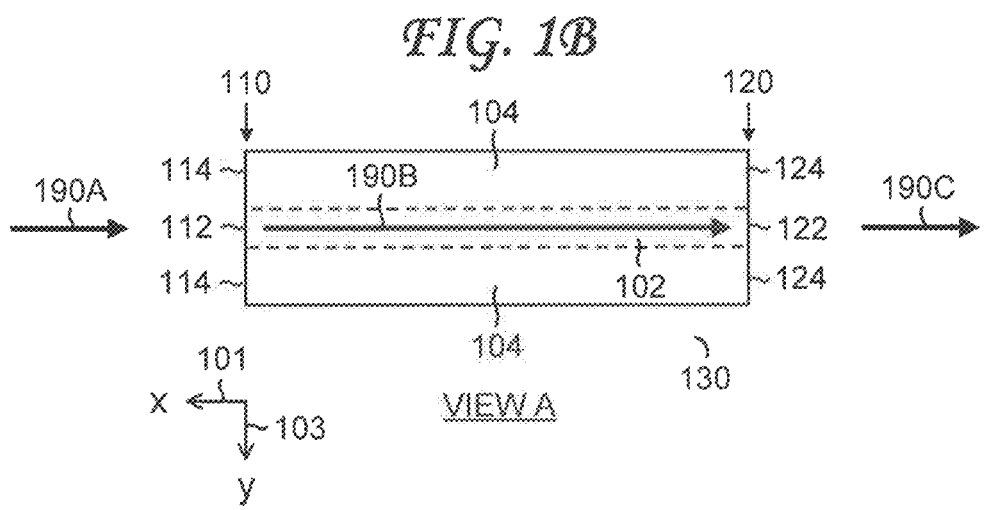
Figure 1C:
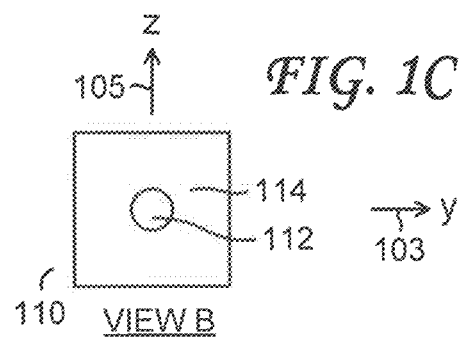

FIG. 1A-FIG. 1C show schematics of a representative phase-sensitive optical device 100, such as an optical waveguide. FIG. 1A shows a perspective view (View P), which includes a reference Cartesian coordinate system defined by the x-axis 101, the y-axis 103, and the z-axis 105. FIG. 1B shows View A, sighted along the −z-axis; FIG. 1C shows View B, sighted along the −x-axis. Unless otherwise stated, only the directions of the reference axes are significant, not the origin of the coordinate system. In the figures, the reference axes are placed at different locations to avoid interference with other elements of the figures.

Refer to FIG. 1A. The optical device 100 includes the optical transport region 102, through which light is propagated, and the cladding region 104; the cladding region is also referred to in some instances as the matrix region or the body region. The optical device 100 has a first end face 110, a second end face 120, and a top surface 130; the end faces are also referred to in some instances as facets. Refer to FIG. 1C, which shows the end face 110. The surface region 112 represents the surface of the optical transport region 102, and the surface region 114 represents the surface of the cladding region 104. Similarly, on the end face 120, the surface region 122 represents the surface of the optical transport region 102, and the surface region 124 represents the surface of the cladding region 104 (FIG. 1A).

Refer to FIG. 1B; the plane of the figure represents the top surface 130. Light enters the optical device 100 at the surface region 112 on the end face 110 (see ray 190A), propagates through the optical transport region 102 (see ray 190B), and exits the optical device 100 at the surface region 122 on the end face 120 (see ray 190C). Performance of the optical device depends at least in part on the difference between the phase of the light entering at the first end face 110 and the phase of the light exiting at the second end face 120. This difference in phase is initially set by the parameters of the optical device as fabricated. To simplify the terminology, the difference between the phase of the light entering at the first end face and the phase of the light exiting at the second end face is referred to herein as the phase value of the optical device.

FIG. 1B shows an optical device operating in a transmission mode. Other optical devices operate in a reflection mode. For example, light enters the optical device at the first end face, propagates through the optical transport region, reflects off the second end face, propagates back through the optical transport region, and exits back through the first end face. For an optical device operating in a reflection mode, the difference between the phase of the light entering at the first end face and the phase of the light exiting at the first end face is referred to herein as the phase value of the optical device. Embodiments of the invention described herein can be implemented for optical devices operating in the transmission mode or the reflection mode.

In an embodiment of the invention, the phase value of a phase-sensitive optical device is modified (changed) by exposing at least a portion of the optical transport region to a laser beam. The optical transport region includes the surface of the optical transport region on the first end face, the surface of the optical transport region on the second end face, and the volume of the optical transport region within the optical device. In practice, at least a portion of the cladding region is also exposed to the laser beam.

Phase modification by a laser beam can result from several chemical and physical mechanisms. For example, under certain conditions, laser heating can anneal a material, reducing stress or reducing damage. In other circumstances, laser heating can induce stress in a material (through, for example, localized temperature gradients). The local effective index of refraction, in turn, is dependent on the local stress. Laser heating can also affect the diffusion of free carriers, which, in turn, can affect optical parameters. For a waveguide, the cross-sectional shape of the waveguide can also be modified by laser heating, resulting in a change in the output phase.

Laser-induced oxidation has been reported for some materials; however, embodiments of the invention disclosed herein are also applicable for materials systems in which laser-induced oxidation does not occur: for example, in a silicon waveguide, the faces are passivated with an oxide coating, and laser-induced oxidation is inhibited. Since the specific mechanisms for laser-induced phase modification are dependent on the specific optical device and the specific materials from which the optical device is fabricated, the general term "laser processing" is used herein for processing a material by exposing it to a laser beam.

Figure 2A:
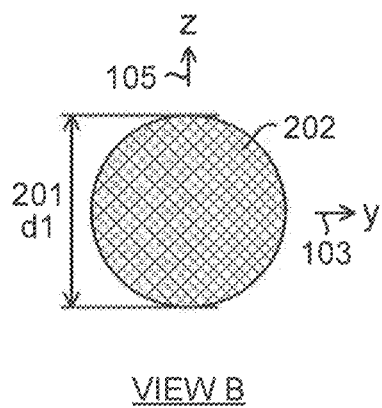
FIG. 2A-FIG. 2D show schematics for laser processing of an optical device using full-field illumination of an end face.

FIG. 2A-FIG. 2D show schematics for laser processing of an optical device using full-field illumination of an end face. FIG. 2A shows a schematic of a laser beam 202 impinging on a surface. For simplicity, the projection of the laser beam 202 onto the surface is represented by a circle with a diameter d1 201; in general, the projection of the laser beam 202 onto the surface can have various geometries.

Figure 2B:
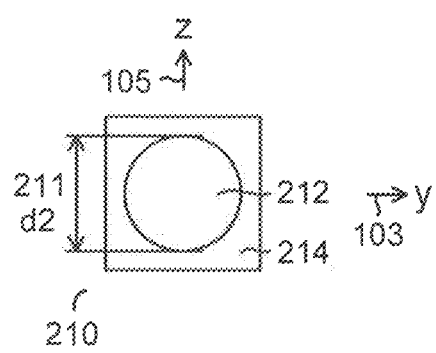

FIG. 2B shows a schematic of the end face 210 of an optical device prior to laser processing. For simplicity, the end face 210 is represented by a square; in general, the end face 210 can have various geometries. The surface region 212 represents the surface of the optical transport region of the optical device. For simplicity, the surface region 212 is represented by a circle with a diameter d2 211; in general, the surface region 212 can have various geometries. The surface region 214 represents the surface of the cladding region of the optical device.

Figure 2C:
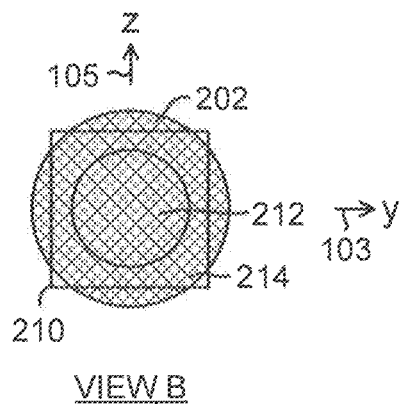
Figure 2D:
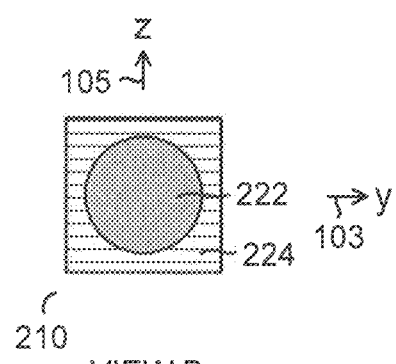

In this example, the diameter d1 of the laser beam 202 is greater than the diameter d2 of the surface region 212. In FIG. 2C, the surface region 212 receives full-field illumination from the laser beam 202; in practice, at least a portion of the surface region 214 is also exposed to the laser beam. FIG. 2D shows a schematic of the end face 210 after laser processing. The surface region 222 represents the surface of the optical transport region that has been phase-modified by the laser processing. The surface region 224 represents the surface of the cladding region that has been exposed to the laser beam. In some instances, certain properties (such as refractive index) of the cladding region can be changed by laser exposure. Changes in certain properties of the cladding region can have a second-order effect on the phase value of the optical device.

FIG. 3A-FIG. 3F show schematics for laser processing of an optical device by rastering a laser beam across an end face. For rastering, different combinations of movements can be used to align the laser beam with respect to the optical device: (a) the optical device can be held stationary, and the laser beam can be moved (the laser beam can be moved by moving the optical assembly or by deflecting the laser beam with a mirror); (b) the laser beam can be held stationary, and the optical device can be moved; or (c) both the laser beam and the optical device can be moved. Specific apparatus is described below. In the example shown in FIG. 3A-FIG. 3F, the optical device is held stationary, while the laser beam is moved.

FIG. 3A shows a laser beam 204 impinging on the end face 210. For simplicity, the projection of the laser beam 204 onto the surface is represented by a circle with a diameter d3 203; in general, the projection of the laser beam 204 onto the surface can have various geometries. In this example, the diameter d3 of the laser beam 204 is smaller than the diameter d2 of the surface region 212 (FIG. 2B). In FIG. 3B, the surface region 306A has been exposed to the laser beam 204, and the laser beam 204 has been moved to the right. The laser beam 204 is rastered left-to-right across the surface region 212; in practice, the laser beam is also rastered across at least a portion of the surface region 214. In FIG. 3C, the surface region 306B represents the surface region that has been exposed to the laser beam 204 after one complete left-to-right sweep.

In FIG. 3D, the laser beam 204 has been moved down to start the sweep of a second row. In FIG. 3E, the surface region 306C represents the surface region that has been exposed to the laser beam 204 after the first and second left-to-right sweeps. The laser beam 204 has been moved down to start the sweep of a third row.

The laser beam 204 is rastered until the entire surface region 212 has been exposed to the laser beam. FIG. 3F shows a schematic of the end face 210 after laser processing. The surface region 322 represents the surface of the optical transport region that has been phase-modified by the laser processing. The surface region 324 represents the surface of the cladding region that has been exposed to the laser beam.

FIG. 4A-FIG. 4D show schematics for laser processing of multiple optical devices using full-field illumination of end faces. As discussed above, different combinations of movements can be used to align the laser beam with respect to an optical device. In the example shown in FIG. 4A-FIG. 4D, the substrate with the multiple optical devices is moved to initially align a specific optical device with the laser beam.

FIG. 4A shows a schematic of an end face 410 of a substrate prior to laser processing. The surface region 420 represents the surface of the optical transport region of a first optical device; the surface region 422 represents the surface of the optical transport region of a second optical device; and the surface region 414 represents the surface of the cladding region. For simplicity, the surface region 420 and the surface region 422 are each represented by a circle with a diameter d4 411. In general, the geometry and dimensions of each surface region can be different.

The spacing between adjacent optical devices is s1 413 (center-to-center). When the substrate holds more than two optical devices, the spacing between any two adjacent optical devices can be constant or can vary. In this example, the diameter d1 of the laser beam 202 (FIG. 2A) is greater than the diameter d4, and the spacing s1 is sufficiently greater than d1 such that, when the laser beam 202 is illuminating one optical device, there is no significant illumination of an adjacent optical device.

In FIG. 4B, the surface region 420 of the first optical device is aligned with the laser beam 202 (the position of the laser beam along the y-axis is indicated by the reference line 401) and receives full-field illumination from the laser beam 202. In FIG. 4C, the surface region 430 represents the surface of the optical transport region (of the first optical device) that has been phase-modified by the laser processing. The surface region 440 represents the surface of the cladding region that has been exposed to the laser beam.

The substrate is translated along the −y axis until the surface region 422 of the second optical device is aligned with the laser beam 202 and receives full-field illumination from the laser beam 202. In FIG. 4D, the surface region 432 represents the surface of the optical transport region (of the second optical device) that has been phase-modified by the laser processing. The surface region 442 represents the surface of the cladding region that has been exposed to the laser beam.

The sequence of laser processing steps shown in FIG. 4A-FIG. 4D can be extended to a one-dimensional (1D) array of more than two optical devices and to a two-dimensional (2D) array of optical devices. After laser processing, the optical devices can be used as an array of optical devices or separated into individual optical devices.

FIG. 5A-FIG. 5D show schematics for laser processing of multiple optical devices by rastering a laser beam across end faces. As discussed above, different combinations of movements can be used to align the laser beam with respect to an optical device. In the example shown in FIG. 5A-FIG. 5D, the substrate with the multiple optical devices is moved to initially align a specific optical device with the laser beam. During laser processing, the optical device is held stationary, while the laser beam is moved.

FIG. 5A shows a schematic of the end face 510 of a substrate prior to laser processing. The surface region 520 represents the surface of the optical transport region of a first optical device; the surface region 522 represents the surface of the optical transport region of a second optical device; the surface region 514 represents the surface of the cladding region. For simplicity, the surface region 520 and the surface region 522 are each represented by a circle with a diameter d5 511. In general, the geometry and the dimensions of each surface region can be different.

The spacing between adjacent optical devices is s2 513 (center-to-center). When the substrate holds more than two optical devices, the spacing between any two adjacent optical devices can be constant or can vary. The minimum spacing between adjacent optical devices is s3 515.

In this example, the diameter d3 of the laser beam 204 (FIG. 3A) is smaller than the diameter d5. The diameter d3 is also sufficiently smaller than s3 such that, when the laser beam 204 is rastered across one optical device, there is no significant illumination of an adjacent optical device. In FIG. 5B, the surface region 520 of the first optical device is aligned with the laser beam 204 (the nominal central position of the laser beam along the y-axis is indicated by the reference line 501), and the laser beam 204 is rastered across the surface region 520.

In FIG. 5C, the surface region 530 represents the surface of the optical transport region (of the first optical device) that has been phase-modified by the laser processing. The surface region 540 represents the surface of the cladding region that has been exposed to the laser beam. The substrate is translated along the −y axis until the surface region 522 of the second optical device is aligned with the laser beam 204, and the laser beam 204 is rastered across the surface region 522 of the second optical device. In FIG. 5D, the surface region 532 represents the surface of the optical transport region (of the second optical device) that has been phase-modified by the laser processing. The surface region 542 represents the surface of the cladding region that has been exposed to the laser beam.

The sequence of laser processing steps shown in FIG. 5A-FIG. 5D can be extended to a one-dimensional (1D) array of more than two optical devices and to a two-dimensional (2D) array of optical devices. After laser processing, the optical devices can be used as an array of optical devices or separated into individual optical devices.

Figure 11A:
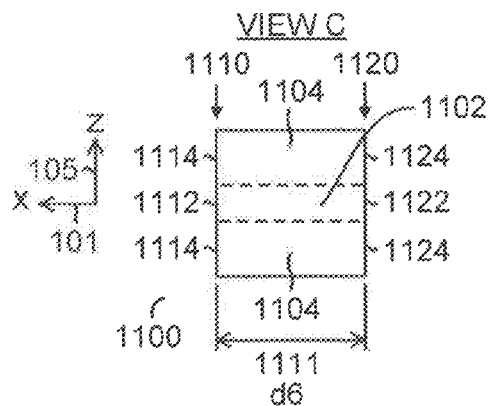
FIG. 11A-FIG. 11F show schematics for laser processing of an optical device using full-field illumination of the optical transport region.
Figure 11B:
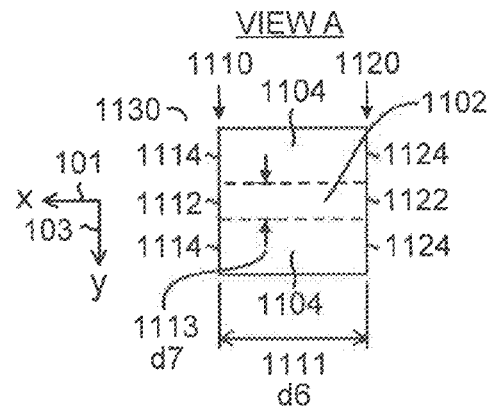

FIG. 11A-FIG. 11F show schematics for laser processing of an optical device using full-field illumination of the volume of an optical transport region. FIG. 11A shows a side view (View C, sighted along the −y axis) of an optical device 1100 (similar to the optical device 100 shown in FIG. 1A-FIG. 1C) prior to laser processing; FIG. 11B shows the corresponding top surface 1130 (View A, sighted along the −z axis). The optical device 1100 includes the optical transport region 1102 and the cladding region 1104. The optical device 1100 has a first end face 1110, a second end face 1120, and a top surface 1130. On the end face 1110, the surface region 1112 represents the surface of the optical transport region 1102, and the surface region 1114 represents the surface of the cladding region 1104. Similarly, on the end face 1120, the surface region 1122 represents the surface of the optical transport region 1102, and the surface region 1124 represents the surface of the cladding region 1104. The distance (measured along the x-axis) between the two end faces is d6 1111; the width of the optical transport region (measured along the y-axis) is d7 1113. Here d7 is less than d6.

Figure 11C:
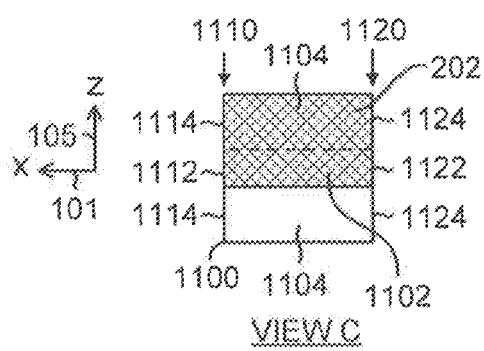
Figure 11D:
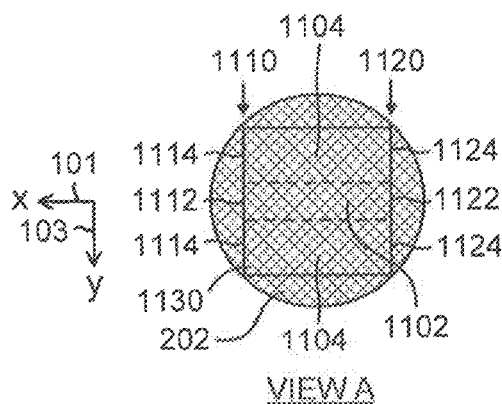
Figure 11E:
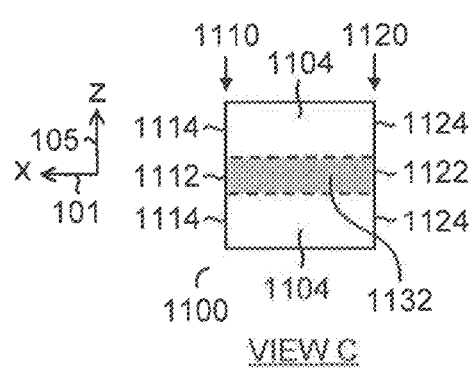
Figure 11F:
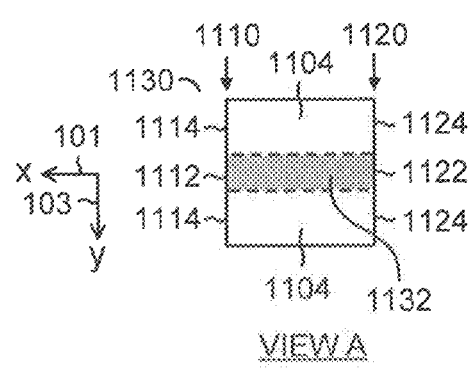

In this example, the laser beam 202 impinges on the top surface 1130 (FIG. 11D). The diameter d1 of the laser beam 202 (FIG. 2A) is sufficiently greater than the distance d6 such that the optical transport region receives full-field illumination from the laser beam 202. Refer to FIG. 11C. The cladding region 1104 is transparent to the laser beam 202, while the optical transport region 1102 absorbs the laser beam 202 (or, more precisely, at the laser wavelength, the absorption coefficient of the cladding region is sufficiently small such that the intensity of the laser beam reaching the optical transport region is sufficient to modify the phase of the optical transport region). FIG. 11E and FIG. 11F show the optical device 1100 after laser processing. The optical transport region 1132 represents the optical transport region that has been phase-modified by laser processing.

As discussed above, in some instances, certain properties (such as refractive index) of the cladding region can be changed by laser exposure. Changes in certain properties of the cladding region can have a second-order effect on the phase value of the optical device.

The sequence of laser processing steps shown in FIG. 11A-FIG. 11F can be extended to a one-dimensional (1D) array of optical devices and to a two-dimensional (2D) array of optical devices. After laser processing, the optical devices can be used as an array of optical devices or separated into individual optical devices.

FIG. 12A-FIG. 12H show schematics for laser processing of an optical device by scanning or rastering a laser beam through the volume of an optical transport region. FIG. 12A shows a side view (View C) of an optical device 1200 (similar to the optical device 100 shown in FIG. 1A-FIG. 1C) prior to laser processing; FIG. 12B shows the corresponding top surface 1230 (View A). The optical device 1200 includes the optical transport region 1202 and the cladding region 1204. The optical device 1200 has a first end face 1210, a second end face 1220, and a top surface 1230. On the end face 1210, the surface region 1212 represents the surface of the optical transport region 1202, and the surface region 1214 represents the surface of the cladding region 1204. Similarly, on the end face 1220, the surface region 1222 represents the surface of the optical transport region 1202, and the surface region 1224 represents the surface of the cladding region 1204. The distance between the two end faces (measured along the x-axis) is d8 1211; the width of the optical transport region (measured along the y-axis) is d9 1213.

In this example, the laser beam 204 impinges on the top surface 1230 (FIG. 12D). The diameter d3 of the laser beam 204 (FIG. 3A) is larger than d9 and smaller than d8. The laser beam 204 is scanned along the length of the optical transport region 1202 (along the x-axis). If the diameter d3 of the laser beam 204 is smaller than d9, then the laser beam 204 can be rastered through the optical transport region 1202.

Refer to FIG. 12C. The cladding region 1204 is transparent to the laser beam 204, while the optical transport region 1202 absorbs the laser beam 204 (or at the very least, at the laser wavelength, the absorption coefficient of the cladding region is sufficiently small such that the intensity of the laser beam reaching the optical transport region is sufficient to modify the phase of the optical transport region).

Refer to FIG. 12E and FIG. 12F. Region 1206A represents the region of the optical transport region that has been phase-modified by laser processing. The laser beam 204 is moved to the right. FIG. 12G and FIG. 12H show the optical device 1200 after laser processing. The optical transport region 1232 represents the optical transport region that has been phase-modified by laser processing. Note that the entire optical transport region does not need to be phase-modified. In some instances, only a portion of the optical transport region is phase-modified.

The sequence of laser processing steps shown in FIG. 12A-FIG. 12H can be extended to a one-dimensional (1D) array of optical devices and to a two-dimensional (2D) array of optical devices. After laser processing, the optical devices can be used as an array of optical devices or separated into individual optical devices.

Figure 6:
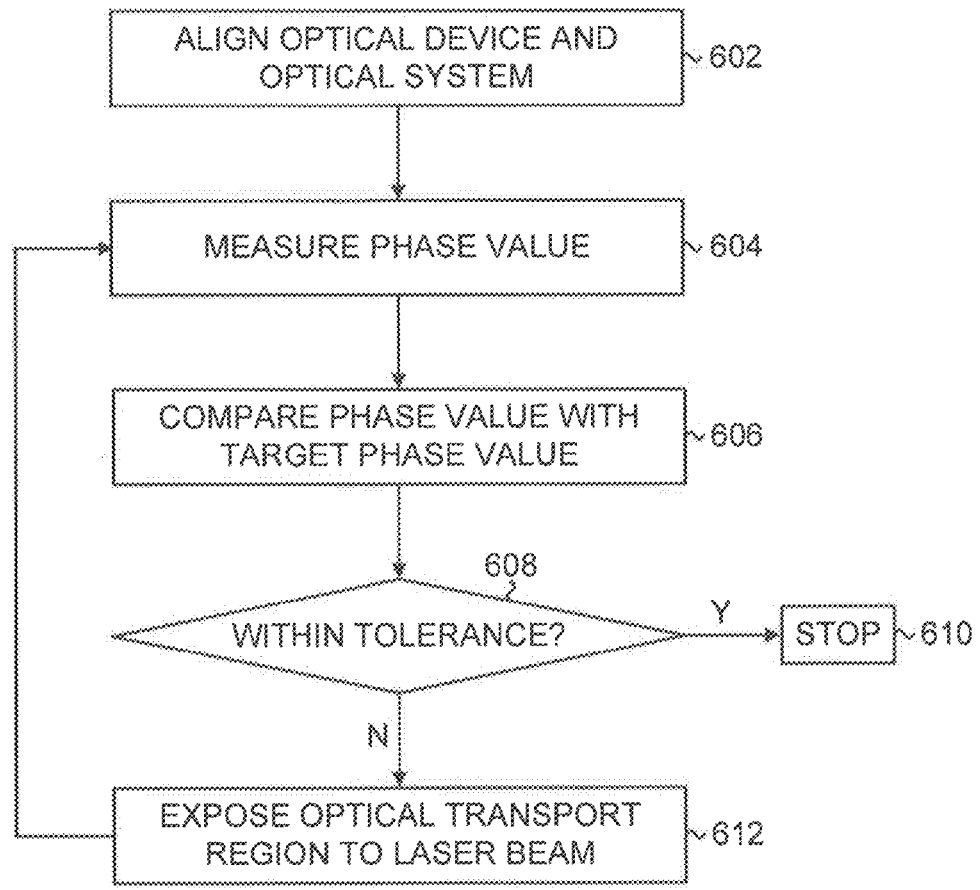
FIG. 6 shows a flowchart of a method for phase correction of a single optical device.

FIG. 6 shows a flowchart of a method for correcting the phase of a phase-sensitive optical device. In this example, an integrated apparatus including both a phase measurement system and a laser processing system is used. Details of this apparatus are described below in reference to FIG. 9A-FIG. 9E.

In step 602, the optical device and the optical system (described below) are aligned. The process then passes to step 604 in which the phase value of the optical device is measured. The process then passes to step 606, in which the measured phase value is compared with the target phase value (also referred to as the design phase value, the desired phase value, or the user-specified phase value).

The process then passes to the decision step 608. If the measured phase value is within a specified tolerance of the target phase value, then the process passes to step 610 (stop), since no correction is needed. The tolerance is specified by, for example, an optical engineer, depending on the specific optical device and the specific application. If the measured phase value is not within the specified tolerance, then the process passes to step 612 in which at least a portion of the optical transport region of the optical device is exposed to a laser beam. As discussed above, a surface of the optical transport region on an end face (or on two end faces) can be exposed, a portion of the volume of the optical transport region can be exposed, or the entire optical transport region can be exposed.

The laser beam is characterized by its spectral distribution (range of wavelengths), intensity, and spot geometry and dimensions. The optical transport region is exposed for a specified exposure time $\Delta t$. The laser can be operated in a pulsed mode, in which case $\Delta t$ is the pulse duration (for a single pulse) or an integer times the pulse duration (for multiple pulses). The intensity can be constant for each exposure cycle or can vary for each exposure cycle. The exposure time can be constant for each exposure cycle or can vary for each exposure cycle. The exposure time during an exposure cycle can be varied by varying the pulse duration or by varying the number of pulses.

The wavelength is selected such that the material of the optical transport region of the optical device to be treated has a relatively high energy absorption coefficient at that wavelength. In an embodiment of the invention, the wavelength ranges from about 300 nm to about 2000 nm.

The intensity and the exposure time are determined by an initial calibration procedure in which the phase shift is measured as a function of the intensity and the exposure time. Below a threshold set of (intensity, exposure time) values, there is no phase shift. At a particular threshold set of (intensity, exposure time) values, there is a measurable phase shift. As the set of (intensity, exposure time) values exceeds the threshold set of (intensity, exposure time) values, the probability of laser-induced damage increases. Therefore, in an embodiment of the invention, the set of (intensity, exposure time) values used for a laser processing cycle is selected to be just above the threshold set of (intensity, exposure time) values. In an embodiment of the invention, a pulse energy of about 0.10 μJ to about 10 mJ is transmitted into a spot with about a 8.7 μm diameter spot size. [The intensity profile is approximately Gaussian. The diameter is specified as the full width between the points at which the intensities are $1/e^2$ (13.5%) of the peak intensity.] The exposure times (single pulse duration) range from about 1 ns to about 100 μs. In an embodiment of the invention, the peak pulse intensity is about 12 MW/cm$^2$ [12 megawatts/square centimeter], and the pulse duration is about 10 ns.

If the size of the laser beam is equal to or larger than the size of the portion of the optical transport region to be treated, then the portion of the optical transport region can be exposed to full-field illumination from the laser beam. If the size of the laser beam is smaller than the size of the portion of the optical transport region to be treated, then the laser beam can be scanned or rastered across the portion of the optical transport region. The choice of full-field illumination, scanning, or rastering depends on a number of parameters, including size and shape of the portion the optical transport region to be treated, minimum spacing between adjacent optical devices (when multiple optical devices are processed), available laser spot size and shape, and available laser intensity.

The process then returns to step 604, in which the phase value of the phase-modified optical device is measured. Step 604-step 612 are iterated until the measured phase value is within the specified tolerance of the target phase value.

Figure 7:
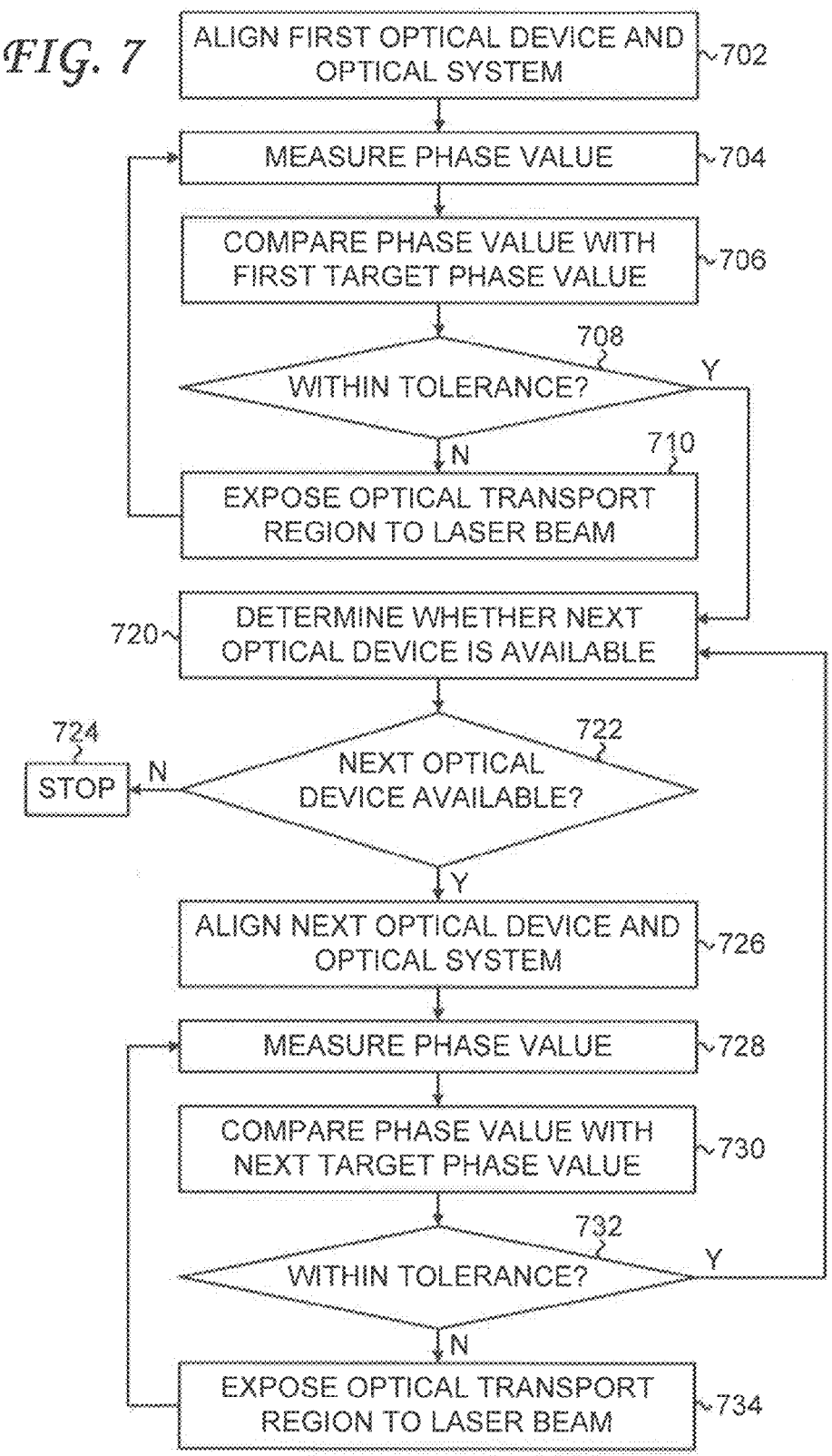
FIG. 7 shows a flowchart of a method for phase correction of multiple optical devices.

FIG. 7 shows a flowchart of a method for correcting the phase of multiple phase-sensitive optical devices. In this example, an integrated apparatus including both a phase measurement system and a laser processing system is used. Details of this apparatus are described below in reference to FIG. 9A-FIG. 9E.

In step 702, the first optical device and the optical system (described below) are aligned. The process then passes to step 704 in which the phase value of the first optical device is measured. The process then passes to step 706, in which the measured phase value is compared with the first target phase value. The target phase values of the optical devices can be the same for all the optical devices or different for each specific optical device.

The process then passes to the decision step 708. If the measured phase value is within a specified tolerance of the first target phase value, then the process passes to step 720 (described below), since no correction is needed. If the measured phase value is not within the specified tolerance, then the process passes to step 710 in which at least a portion of the optical transport region of the optical device is exposed to a laser beam (either by full-field illumination, scanning, or rastering) for a specified exposure time.

The process then returns to step 704, in which the phase value of the phase-modified first optical device is measured. Step 704-step 710 are iterated until the measured phase value of the first optical device is within the specified tolerance of the first target phase value.

The process then passes to step 720, in which availability of a next optical device is determined. The process then passes to the decision step 722. If a next optical device is not available, then the process passes to step 724 (stop). If a next optical device is available, then the process passes to step 726, in which the next optical device and the optical system are aligned. The process then passes to step 728 in which the phase value of the next optical device is measured. The process then passes to step 730, in which the measured phase value is compared with the next target phase value.

The process then passes to the decision step 732. If the measured phase value is within a specified tolerance of the next target phase value, then the process returns to step 720, since no correction is needed. If the measured phase value is not within the specified tolerance, then the process passes to step 734 in which at least a portion of the optical transport region of the next optical device is exposed to a laser beam for a specified exposure time.

The process then returns to step 728, in which the phase of the phase-modified next optical device is measured. Step 728-step 734 are iterated until the measured phase value of the next optical device is within the specified tolerance of the next target phase value. Step 720-step 734 are iterated until all available optical devices have been processed.

Figure 8:
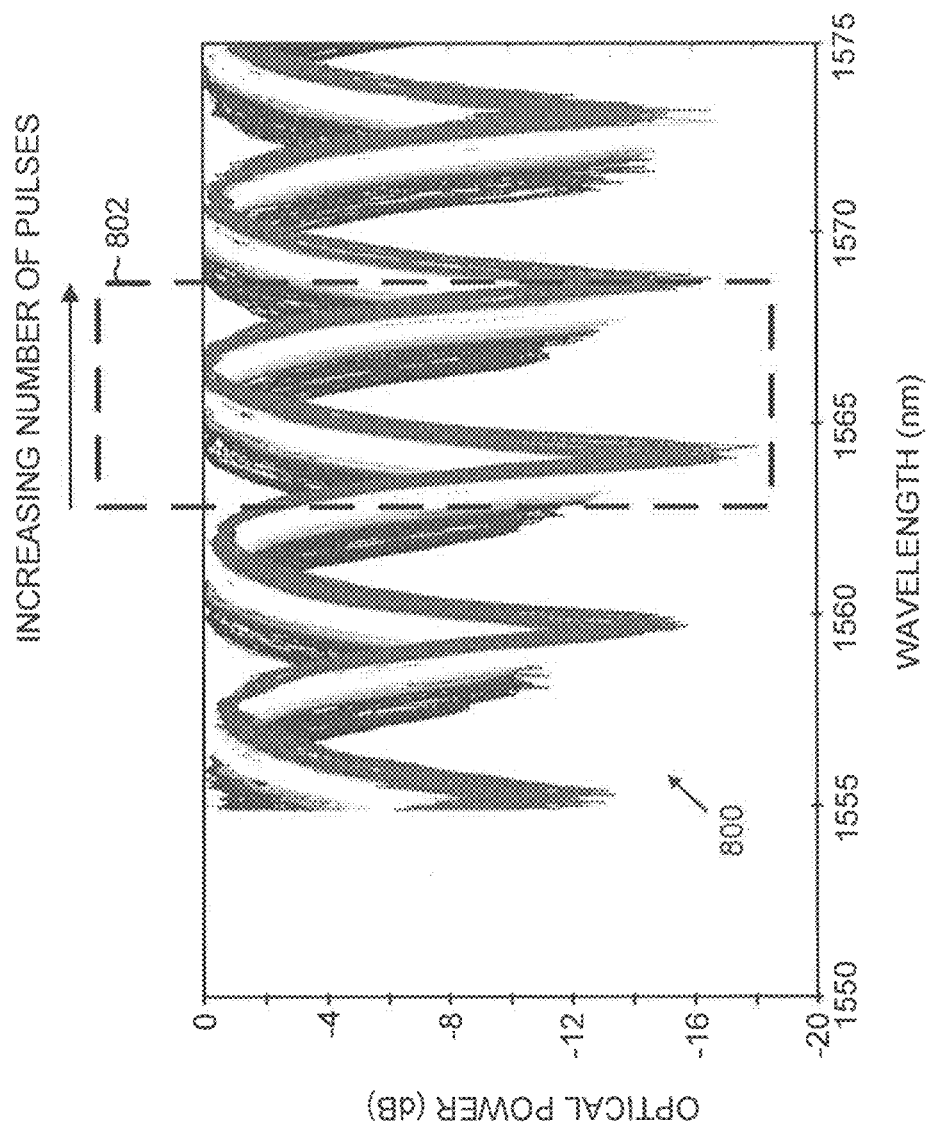
FIG. 8 shows a plot of the phase shift as a function of the number of laser processing cycles for a silicon waveguide.

FIG. 8 shows plot 800, the output of a Mach-Zehnder interferometer. The horizontal axis represents the wavelength in (nm); the vertical axis represents the optical power in dB. In one arm of the Mach-Zehnder interferometer is a silicon waveguide which is subjected to a sequence of laser pulses. The wavelength of the laser is about 1064 nm (from a Q-switched YAG laser), the pulse duration is about 10 ns, and the energy delivered per pulse is about 0.2 µJ. The width (d9 in FIG. 12B) of the waveguide is about 400 nm, and the diameter of the laser beam is about 8.7 µm.

Refer to the band of fringes 802 highlighted in the dotted rectangular box. Each fringe corresponds to a phase measurement after the optical transport region has been exposed to a sequential pulse. The band of fringes corresponds to measurements over a sequence from 1 to 220 pulses. The shift in wavelength after 220 pulses corresponds to a phase shift of about 180 deg; the phase shift per pulse is about 0.8 deg. By calibrating the phase shift per pulse, the required exposure time can be estimated. For example, if the initial measured phase value is 10 deg from the target phase value, an initial exposure of 10 pulses can be used to generate an initial phase shift of about 8 deg. Additional cycles of 1 pulse each can then be used to fine-tune the phase value. In this manner, the number of processing-measurement cycles can be minimized.

In the methods described above with respect to the flowcharts shown in FIG. 6 and FIG. 7, the phase value of the optical device is initially measured after fabrication and then re-measured after each laser processing cycle. In another embodiment of the invention, measurements of the initial phase values of similar optical devices are maintained in a database. In one example, the optical devices are from previous production lots. In another example, the optical devices are fabricated on the same substrate as the optical device undergoing laser processing. If the statistical distribution of the initial phase values is sufficiently tight, then the measurement of the initial phase value of the optical device undergoing laser processing is not required: it is estimated from the previous measurements of the initial phase values of similar optical devices. Furthermore, if the phase shift as a function of exposure time (for a specified intensity) is sufficiently characterized and controlled (as discussed above), then measurement of the phase value after a laser processing cycle is also not required: the exposure time is determined from (a) the difference between the estimated initial phase value and the target phase value and (b) the phase shift as a function of exposure time.

Depending on the specific optical device and the specific materials from which the optical device is fabricated, exposure of the optical transport region of the optical device to a laser beam can result in phase advance or phase retardation. Since phase is determined modulo $2\pi$ radians (360 degrees), however, the phase can be corrected via phase advance or phase retardation. In addition, if the phase is over-corrected (that is, the exposure time is too long), the phase can be re-corrected by shifting the phase past the next integer multiple of $2\pi$ radians (360 degrees).

FIG. 9A-FIG. 9E show a schematic of an apparatus 900, according to an embodiment of the invention, for performing the methods described above in reference to the flowcharts shown in FIG. 6 and FIG. 7.

Figure 9A:
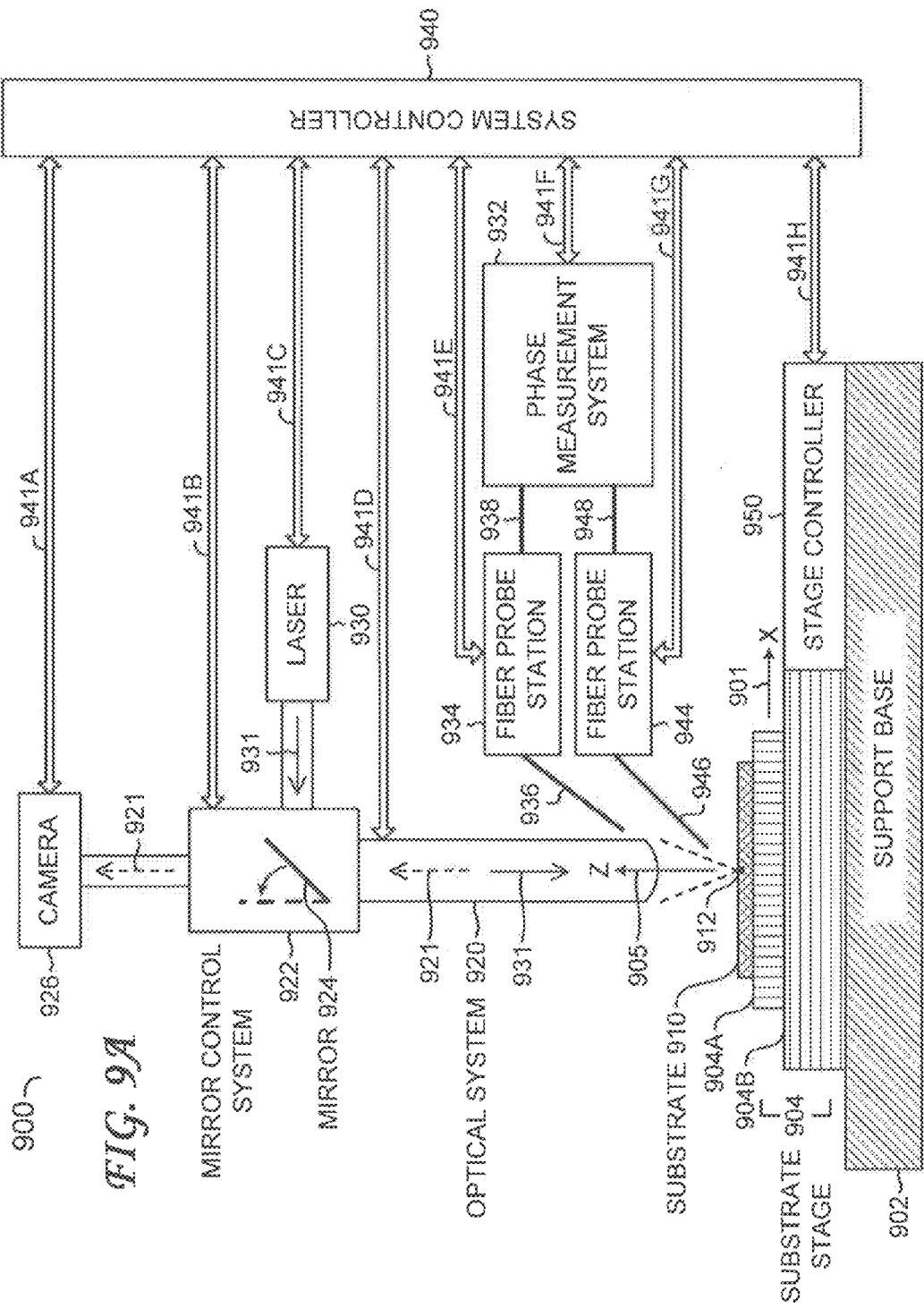

Refer to FIG. 9A. The substrate stage 904 is mounted on the support base 902. The substrate stage 904 includes the fixed portion 904B and the movable portion 904A. The movable portion 904A can, for example, translate along a first orthogonal axis, a second orthogonal axis, and a third orthogonal axis, and rotate about the third orthogonal axis. The first orthogonal axis is referenced as the X-axis 901; the second orthogonal axis is referenced as the Y-axis (not shown, but pointing into the plane of the figure); and the third orthogonal axis is referenced as the Z-axis 905. Operation of the substrate stage 904 is controlled by servo controls and the stage controller 950. The movable portion 904A holds the substrate 910, which can include one or more optical devices;

optical device 912 is a representative optical device. The movable portion 904A can also hold one or more optical devices not on a substrate.

The optical system 920 includes lenses and servo controls for focussing and alignment. The optical system 920 operates in two operational modes. The mirror control system 922 includes servo controls for changing the position of the rotatable mirror 924. When the rotatable mirror 924 is in the up position (shown as a dashed line), the optical system 920 operates as a microscope and images light 921 from the substrate 910 onto the camera 926 (for simplicity, the illumination system for the microscope is not shown); the microscope image can also be viewed through an eyepiece (not shown). The substrate stage 904 and the camera 926 can be used to align the optical device 912 with the optical system 920 (in this example, the substrate is moved, while the optical system is held stationary).

When the rotatable mirror 924 is in the down position (shown as a solid line), the laser beam 931 transmitted by the laser 930 is reflected by the rotatable mirror 924 down through the optical system 920, which focusses the laser beam 931 onto the optical device 912. Note that the rotatable mirror 924 can be replaced by a fixed dichroic mirror, which reflects at the wavelength of the laser 930 and transmits at visible wavelengths.

As discussed above, different combinations of movements can be used to align the laser beam with respect to the optical device: (a) the optical device can be held stationary, and the laser beam can be moved (the laser beam can be moved by moving the optical system or by deflecting the laser beam with a mirror); (b) the laser beam can be held stationary, and the optical device can be moved; or (c) both the laser beam and the optical device can be moved. In general, embodiments of the invention include an alignment system that can change the relative position of the laser beam with respect to the optical device. In the apparatus 900 shown in FIG. 9A, the optical device can be moved by the substrate stage 904. In other embodiments, the laser beam can be moved by moving the optical system 920 (the optical system 920, for example, can be mounted on a movable carriage that can be moved under servo control), or the laser beam can be moved, for example, by changing the angle of the rotatable mirror 924 under servo control to deflect the laser beam. Combinations of different mechanisms can be used; for example, an alignment system can have a substrate stage to move the optical device, a movable carriage to move the optical system, and a rotatable mirror to move the laser beam.

Measurement of the phase value of the optical device 912 is performed by the fiber probe station 934, the fiber probe station 944, and the phase measurement system 932. Various phase measurement systems can be used. These are well-known in the art and further details are not discussed herein. For example, a phase measurement system using a Mach-Zehnder interferometer is described in the journal publication K. Takada, "Phase Error Measurement of an Arrayed-Waveguide Grating in the 1.3-μm Wavelength Region by Optical Low Coherence Interferometry," IEEE Photonics Technology Letters, Vol. 14, No. 7, July 2002, pp. 965-967. The optical device is coupled into one arm of the Mach-Zehnder interferometer via fiber probes, as described below.

The fiber probe station 934 and the fiber probe station 944 can be aligned with respect to the optical device 912 via servo controls by the system controller 940. The fiber probe station 934 includes the optical fiber probe 936, which is positioned in the proximity of the optical device 912 (see further details below), and the optical fiber 938 which connects the optical fiber probe 936 to the phase measurement system 932. Similarly, the fiber probe station 944 includes the optical fiber probe 946, which is positioned in the proximity of the optical device 912 (see further details below), and the optical fiber 948 which connects the optical fiber probe 946 to the phase measurement system 932.

Refer to FIG. 9B. The substrate 910A has a set of optical devices 960; optical device 962 is a representative optical device operating in a transmission mode. Refer to FIG. 9C, which shows a cross-sectional view (View X-X') of the optical device 962. In this instance, the optical device 962 is a laterally aligned silicon waveguide, with the optical axis parallel to the x-y plane of the surface of the Si substrate 910A. To measure the phase value of the optical device, optical couplers that change the angle of the light path are needed. Examples of suitable optical couplers include grating-type optical couplers fabricated from a single fiber, multiple fibers, an array of fibers, or multiple arrays of fibers.

In the example shown in FIG. 9C, Si gratings are fabricated directly on the Si substrate adjacent to the end faces of the waveguide 962: grating 970 is adjacent to the end face 964, and grating 972 is adjacent to the end face 966. The optical fiber probe 936 is positioned near the grating 970. The optical fiber probe 936 transmits a test optical signal from the phase measurement system 932 into the grating 970 (see ray 971A); the grating 970 then directs the optical test signal through the waveguide 962 (see ray 971B); the optical test signal exits the waveguide 962; and the grating 972 then directs the optical test signal away from the substrate 910A (see ray 971C). The optical fiber probe 946 is positioned near the grating 972. The optical fiber probe 946 receives the optical test signal (ray 971C) and transmits it to the phase measurement system 932. The phase value of the waveguide 962 is determined as the phase difference between the optical test signal at the end face 964 and the optical test signal at the end face 966. Phases can be referenced to the edges of the grating; therefore, the phase value of the waveguide 962 is independent of positioning errors of the optical fiber probes.

Refer to FIG. 9D. The substrate 910B has a set of optical devices 980; optical device 982 is a representative optical device operating in a reflection mode. Refer to FIG. 9E, which shows a cross-sectional view (View X-X') of the optical device 982. In this instance, the optical device 982 is, for example, a vertically aligned resonator or a vertical cavity surface emitting laser (VCESL), with the optical axis orthogonal to the x-y plane of the surface of the substrate 910B.

The optical fiber probe 936 is positioned above the optical device 982. The optical fiber probe 936 transmits a test optical signal from the phase measurement system 932 into the end face 984 (see ray 973A); the optical test signal propagates through the optical device 982 (see ray 973B); the optical test signal reflects off the end face 986; the optical test signal propagates back through the optical device 982 (see ray 973C); and the optical test signal exits back out the end face 984 (see ray 973D). The optical fiber probe 936 receives the optical test signal (ray 973D) and transmits it to the phase measurement system 932. The phase value of the optical device 982 is determined as the phase difference between the optical test signal entering the end face 984 and the optical test signal exiting the end face 986.

Return to FIG. 9A. The optical fiber probes (936, 946) can be positioned near the optical system 920 and used to measure the phase value of the optical device 912 while the optical device 912 is positioned under the optical system 920. Alternatively, the optical fiber probes can be positioned away from the optical system 920. After the optical device has been laser processed, it can be moved by the substrate stage 904 to the optical fiber probes.

Overall control of the apparatus is performed by the system controller 940, which communicates with the various components via the measurement and control signals (analog or digital) 941A-941H.

Figure 10:
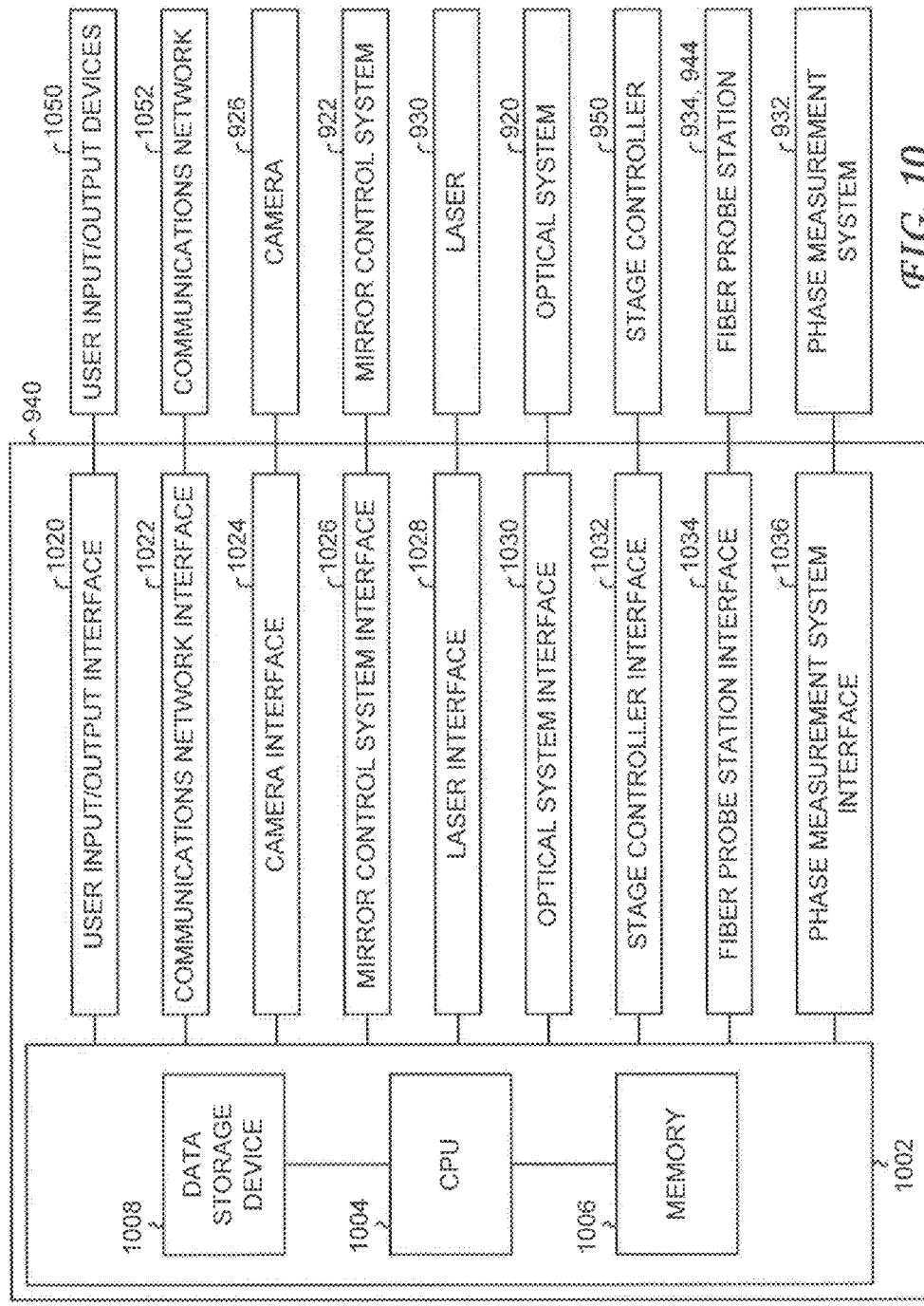
FIG. 10 shows a schematic of a system controller implemented with a computer.

An embodiment of the system controller 940 is shown in FIG. 10. One skilled in the art can construct the system controller 940 from various combinations of hardware, firmware, and software. One skilled in the art can construct the system controller 940 from various electronic components, including one or more general purpose processors (such as microprocessors), one or more digital signal processors, one or more application-specific integrated circuits (ASICs), and one or more field-programmable gate arrays (FPGAs).

The system controller 940 includes a computer 1002, which includes a processor [referred to as the central processing unit (CPU)] 1004, memory 1006, and a data storage device 1008. The data storage device 1008 includes at least one persistent, non-transitory, tangible computer readable medium, such as non-volatile semiconductor memory, a magnetic hard drive, or a compact disc read only memory.

The system controller 940 further includes a user input/output interface 1020, which interfaces the computer 1002 to the user input/output devices 1050. Examples of the user input/output devices 1050 include a keyboard, a mouse, a local access terminal, and a video display. Data, including computer executable code, can be transferred to and from the computer 1002 via the user input/output interface 1020.

The system controller 940 further includes a communications network interface 1022, which interfaces the computer 1002 with a communications network 1052. Examples of the communications network 1052 include a local area network and a wide area network. A user can access the computer 1002 via a remote access terminal (not shown) communicating with the communications network 1052. Data, including computer executable code, can be transferred to and from the computer 1002 via the communications network interface 1022.

The system controller 940 further includes the following interfaces:
- a camera interface 1024, which interfaces the computer 1002 with the camera 926 (FIG. 9A);
- a mirror control system interface 1026, which interfaces the computer 1002 with the mirror control system 922 (FIG. 9A);
- a laser interface 1028, which interfaces the computer 1002 with the laser 930 (FIG. 9A);
- an optical system interface 1030, which interfaces the computer 1002 with the optical system 920 (FIG. 9A);
- a stage controller interface 1032, which interfaces the computer 1002 with the stage controller 950 (FIG. 9A);
- a fiber probe station interface 1034, which interfaces the computer 1002 with the fiber probe station 934 and the fiber probe station 944 (FIG. 9A); and
- a phase measurement system interface 1036, which interfaces the computer 1002 with the phase measurement system 932 (FIG. 9A).

As is well known, a computer operates under control of computer software, which defines the overall operation of the computer and applications. The CPU 1004 controls the overall operation of the computer and applications by executing computer program instructions that define the overall operation and applications. The computer program instructions can be stored in the data storage device 1008 and loaded into the memory 1006 when execution of the program instructions is desired. Control algorithms, such as control algorithms for performing the methods shown schematically in the flowcharts of FIG. 6 and FIG. 7, can defined by computer program instructions stored in the memory 1006 or in the data storage device 1008 (or in a combination of the memory 1006 and the data storage device 1008) and controlled by the CPU 1004 executing the computer program instructions. For example, the computer program instructions can be implemented as computer executable code programmed by one skilled in the art to perform algorithms. Accordingly, by executing the computer program instructions, the CPU 1004 executes the control algorithms.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for modifying a phase value of a phase-sensitive optical device comprising an optical transport region, the method comprising the step of:
exposing at least a portion of the optical transport region to a laser beam such that the phase value changes from a first phase value to a second phase value, wherein the second phase value is different from the first phase value.

2. The method of claim 1, wherein exposing at least a portion of the optical transport region to a laser beam does not induce oxidation of the at least a portion of the optical transport region.

3. The method of claim 1, wherein:
the laser beam has a specified intensity;
exposing at least a portion of the optical transport region to a laser beam comprises exposing the at least a portion of the optical transport region to the laser beam for a specified exposure time; and
the specified intensity and the specified exposure time are based at least in part on a difference between the first phase value and a target phase value.

4. The method of claim 3, further comprising the step of:
measuring the first phase value prior to exposing at least a portion of the optical transport region to a laser beam.

5. The method of claim 3, wherein the phase-sensitive optical device is one of a plurality of phase-sensitive optical devices, further comprising the steps of:
measuring a phase value of at least one phase-sensitive optical device in the plurality of phase-sensitive optical devices prior to exposing at least a portion of the optical transport region to a laser beam; and
estimating the first phase value based at least in part on the at least one measured phase value.

6. The method of claim 1, further comprising the step of:
upon determining that the second phase value is not within a specified tolerance of a target phase value:
exposing the at least a portion of the optical transport region to the laser beam such that the phase value changes from the second phase value to a third phase value, wherein the third phase value is different from the second phase value.

7. The method of claim 1, wherein the at least a portion of the optical transport region comprises a surface of the optical transport region.

8. The method of claim 1, wherein the at least a portion of the optical transport region comprises at least a portion of a volume of the optical transport region.

9. The method of claim 1, wherein:
the phase-sensitive optical device comprises an end face;
the at least a portion of the optical transport region comprises a surface of the optical transport region;
the surface of the optical transport region is disposed on the end face; and
exposing at least a portion of the optical transport region comprises transmitting the laser beam onto the surface of the optical transport region.

10. The method of claim 1, wherein:
the phase-sensitive optical device further comprises a cladding region surrounding the optical transport region;
the at least a portion of the optical transport region comprises at least a portion of a volume of the optical transport region; and
exposing at least a portion of the optical transport region to a laser beam comprises transmitting the laser beam through at least a portion of the cladding region and into the at least a portion of the volume of the optical transport region.

11. The method of claim 1, wherein the laser beam has a wavelength from about 300 nanometers to about 2000 nanometers.

12. The method of claim 1, wherein the laser beam has a peak pulse intensity of about 12 megawatts/square centimeter.

13. The method of claim 12, wherein exposing at least a portion of the optical transport region to a laser beam comprises exposing the at least a portion of the optical transport region to the laser beam for an exposure time of about 10 nanoseconds.

14. The method of claim 1, wherein the phase-sensitive optical device is selected from the group consisting of:
an optical-fiber based device;
a microbead resonator;
an optical waveguide device;
an electro-optic polymer device;
a free carrier effect based modulator; and
an electro-optic device.

15. The method of claim 1, wherein the phase-sensitive optical device is fabricated from at least one material selected from the group consisting of:
silica;
silicon;
germanium;
lithium niobate;
a compound semiconductor;
a polymer; and
a non-centro-symmetric crystalline material.

16. An apparatus for correcting a phase value of a phase-sensitive optical device, the apparatus comprising:
a laser configured to transmit a laser beam;
an optical system configured to:
in a first operational mode, receive the laser beam from the laser and focus the laser beam onto at least a portion of an optical transport region of the phase-sensitive optical device, wherein, when the at least a portion of the optical transport region of the phase-sensitive optical device is exposed to the laser beam, the phase value of the phase-sensitive optical device is modified; and
in a second operational mode, generate an image of at least a portion of the phase-sensitive optical device;
an alignment system configured to change a position of the laser beam with respect to a position of the phase-sensitive optical device;
a phase measurement system configured to measure the phase value of the phase-sensitive optical device; and
at least one optical fiber probe configured to operably couple the phase-sensitive optical device to the phase measurement system.

17. The apparatus of claim 16, wherein the alignment system comprises at least one alignment system selected from the group consisting of:
a stage configured to:
hold the optical device; and
move the optical device;
a carriage configured to move the optical system; and
a deflection system configured to move the position of the laser beam.

18. The apparatus of claim 16, wherein the laser beam has a wavelength from about 300 nanometers to about 2000 nanometers.

19. The apparatus of claim 16, further comprising a system controller configured to control operation of the laser, the optical system, the alignment system, the phase measurement system, and the at least one optical fiber probe.

20. The apparatus of claim 19, wherein the system controller comprises:
a processor;
memory operably coupled to the processor; and
a data storage device operably coupled to the processor, wherein the data storage device stores computer program instructions, which, when executed by the processor, cause the processor to execute a method comprising the steps of:
measuring a first phase value of the phase-sensitive optical device;
comparing the measured first phase value with a target phase value;
determining whether the measured first phase value is within a specified tolerance of the target phase value; and
upon determining that the measured first phase value is not within the specified tolerance of the target phase value, performing the steps of:
(a) exposing at least a portion of an optical transport region of the phase-sensitive optical device to a laser beam such that the phase value of the phase-sensitive optical device is modified;
(b) measuring the phase value of the phase-sensitive optical device after exposing the at least a portion of the optical transport region to the laser beam;
(c) comparing the measured phase value with the target phase value;
(d) determining whether the measured phase value is within the specified tolerance of the target phase value; and
(e) upon determining that the measured phase value is not within the specified tolerance of the target phase value, repeating steps (a)-(d).

* * * * *